US008873185B2

(12) United States Patent
Tanaka et al.

(10) Patent No.: US 8,873,185 B2
(45) Date of Patent: Oct. 28, 2014

(54) THERMALLY-ASSISTED MAGNETIC RECORDING HEAD

(71) Applicant: TDK Corporation, Tokyo (JP)

(72) Inventors: Kosuke Tanaka, Tokyo (JP); Susumu Aoki, Tokyo (JP); Keita Kawamori, Tokyo (JP); Hiroki Kawato, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/849,784

(22) Filed: Mar. 25, 2013

(65) Prior Publication Data

US 2014/0285919 A1    Sep. 25, 2014

(51) Int. Cl.
 *G11B 5/02*    (2006.01)
 *G11B 11/00*   (2006.01)
 *G11B 5/127*   (2006.01)

(52) U.S. Cl.
 CPC .................................. *G11B 5/127* (2013.01)
 USPC .......................................... 360/59; 369/13.33

(58) Field of Classification Search
 None
 See application file for complete search history.

(56) References Cited

U.S. PATENT DOCUMENTS

| | | | |
|---|---|---|---|
| 6,649,894 B2 | 11/2003 | Matsumoto et al. | |
| 6,768,556 B1 | 7/2004 | Matsumoto et al. | |
| 7,330,404 B2 | 2/2008 | Peng et al. | |
| 8,040,761 B2 | 10/2011 | Kawamori et al. | |
| 8,462,594 B1 * | 6/2013 | Aoki et al. | 369/13.33 |
| 8,750,082 B1 * | 6/2014 | Shimazawa et al. | 369/13.33 |
| 8,760,979 B1 * | 6/2014 | Chou et al. | 369/13.33 |
| 2010/0315735 A1 * | 12/2010 | Zhou et al. | 360/59 |
| 2011/0228419 A1 * | 9/2011 | Tanaka et al. | 360/59 |
| 2011/0286128 A1 * | 11/2011 | Tsutsumi et al. | 360/59 |
| 2012/0188859 A1 * | 7/2012 | Hara et al. | 369/13.33 |
| 2013/0107681 A1 * | 5/2013 | Sasaki et al. | 369/13.33 |

FOREIGN PATENT DOCUMENTS

| | | |
|---|---|---|
| JP | A-2001-255254 | 9/2001 |
| JP | B2-4032689 | 1/2008 |
| JP | B2-4104584 | 6/2008 |
| JP | A-2011-8899 | 1/2011 |

OTHER PUBLICATIONS

U.S. Appl. No. 13/316,989, filed Dec. 12, 2011 by Jin et al.

* cited by examiner

*Primary Examiner* — Regina N Holder
(74) *Attorney, Agent, or Firm* — Oliff PLC

(57) ABSTRACT

The thermally-assisted magnetic recording head includes: a magnetic pole having an end exposed on an air-bearing surface; a waveguide; a plasmon generator formed essentially of a first metallic material, and having a first region and a second region, the first region extending backward from the air-bearing surface to a first position, and the second region being coupled with the first region at the first position and extending backward from the first position; and a metallic layer filling a part in the second region, and formed essentially of a second metallic material that has a higher melting temperature than a melting temperature of the first metallic material.

16 Claims, 11 Drawing Sheets

THERMALLY-ASSISTED MAGNETIC RECORDING HEAD

BACKGROUND OF THE INVENTION

1. Field of the Invention

The invention relates to a thermally-assisted magnetic recording head used in thermally-assisted magnetic recording in which near-field light is applied to a magnetic recording medium to lower a coercivity thereof so as to record information.

2. Description of Related Art

In the past, a magnetic disk unit has been used for writing and reading magnetic information (hereinafter, simply referred to as information). The magnetic disk unit includes, in the housing thereof for example, a magnetic disk in which information is stored, and a magnetic read write head that records information into the magnetic disk and reproduces information stored in the magnetic disk. The magnetic disk is supported by a rotary shaft of a spindle motor, which is fixed to the housing, and rotates around the rotary shaft. On the other hand, the magnetic read write head is formed on a side surface of a magnetic head slider provided on one end of a suspension, and includes a magnetic write element and a magnetic read element that have an air-bearing surface (ABS) facing the magnetic disk. In particular, as the magnetic read element, a magnetoresistive (MR) element exhibiting MR effect is generally used. The other end of the suspension is attached to an end of an arm pivotally supported by a fixed shaft installed upright in the housing.

When the magnetic disk unit is not operated, namely, when the magnetic disk does not rotate and remains stationary, the magnetic read write head is not located over the magnetic disk and is pulled off to the outside (unload state). When the magnetic disk unit is driven and the magnetic disk starts to rotate, the magnetic read write head is changed to a state where the magnetic read write head is moved to a predetermined position over the magnetic disk together with the suspension (load state). When the rotation number of the magnetic disk reaches a predetermined number, the magnetic head slider is stabilized in a state of slightly floating over the surface of the magnetic disk due to the balance of positive pressure and negative pressure, and thus, information is accurately recorded and reproduced.

In recent years, along with a progress in higher recording density (higher capacity) of the magnetic disk, improvement in performance of the magnetic read write head and the magnetic disk has been demanded. The magnetic disk is a discontinuous medium including collected magnetic microparticles, and each magnetic microparticle has a single-domain structure. In the magnetic disk, one recording bit is configured of a plurality of magnetic microparticles. Since it is necessary for the asperity of a boundary between adjacent recording bits to be small in order to increase the recording density, it is necessary for the magnetic microparticles to be made small. However, if the magnetic microparticles are made small in size, thermal stability of the magnetization of the magnetic microparticles is disadvantageously lowered with decrease in volume of the magnetic microparticles. To solve the issue, increasing anisotropy energy of the magnetic microparticle is effective. However, increasing the anisotropy energy of the magnetic microparticle leads to increase in coercivity of the magnetic disk, and as a result, difficulty occurs in the information recording in the existing magnetic head.

As a method to solve the above-described difficulty, a so-called thermally-assisted magnetic recording has been proposed. In the method, a magnetic disk with large coercivity is used, and when information is written, heat is applied together with the magnetic field to a section of the magnetic disk where the information is written to increase the temperature and to lower the coercivity of that section, thereby writing the information. Hereinafter, the magnetic head used in the thermally-assisted magnetic recording is referred to as a thermally-assisted magnetic recording head.

In performing the thermally-assisted magnetic recording, near-field light is generally used for applying heat to a magnetic disk. For example, in Japanese Unexamined Patent Application Publication No. 2001-255254 and in Japanese Patent No. 4032689, disclosed is a technology of allowing frequency of light to coincide with a resonant frequency of plasmons that are generated in a metal, by directly applying the light to a plasmon generator, in order to generate near-field light. In the method of directly applying light to a plasmon generator, however, the plasmon generator itself overheats and accordingly deforms, depending on usage environment or conditions and therefore, practical realization of the method is difficult.

Therefore, as a technology capable of avoiding such overheating, in Japanese Patent No. 4104584, a thermally-assisted head using surface plasmon polariton coupling is proposed. In this technology, without direct irradiation of light propagating through a waveguide (guided light) to a plasmon generator, the guided light is coupled with the plasmon generator through evanescent coupling, and surface plasmon polaritons generated on a surface of the plasmon generator are used.

In the thermally-assisted magnetic recording head using such surface plasmon polariton, temperature increase of the plasmon generator is suppressed to some extent. However, it was confirmed that, for example, when the plasmon generator is formed of Au (gold), deformation due to heat may occur particularly in a section with small volume in the vicinity of the air-bearing surface where the heat is concentrated, in some cases.

SUMMARY OF THE INVENTION

When such deformation occurs, a tip section of the plasmon generator is receded from the air-bearing surface and backs away from the magnetic recording medium. Therefore, it causes degradation of recording property. Accordingly, it is desirable to provide a thermally-assisted magnetic recording head capable of suppressing deformation of a plasmon generator during operation and performing magnetic recording with higher density.

A thermally-assisted magnetic recording head according to an embodiment of the invention includes: a magnetic pole having an end exposed on an air-bearing surface; a waveguide; a plasmon generator formed essentially of a first metallic material, and having a first region and a second region, the first region extending backward from the air-bearing surface to a first position, and the second region being coupled with the first region at the first position and extending backward from the first position; and a metallic layer filling a part in the second region, and formed essentially of a second metallic material that has a higher melting temperature than a melting temperature of the first metallic material.

A head gimbal assembly, a head arm assembly, and a magnetic disk unit according to respective embodiments of the invention each include the above-described thermally-assisted magnetic recording head.

In the thermally-assisted magnetic recording head, the head gimbal assembly including the same, the head arm assembly including the same, and the magnetic disk unit including the same according to the respective embodiments of the invention, the metallic layer filling the part of the second region of the plasmon generator is provided. The second metallic material configuring the metallic layer has the higher melting temperature than that of the first metallic material configuring the plasmon generator. The presence of the metallic layer prevents the second region from being pulled by the first region and from being accordingly receded from the air-bearing surface even when the volume of the first region whose temperature becomes highest during operation is smaller than the volume of the second region. In addition, the metallic layer itself is not agglomerated. Further, the peripheral section of the metallic layer in the second region remains at a temperature lower than that of the first region, and thus is not agglomerated. On the other hand, since the first region and the second region are coupled with each other, surface plasmons that are generated by evanescent coupling between the second region and light propagating through the waveguide effectively propagate in the first region. Therefore, even when the temperature of the first region of the plasmon generator is increased during operation, the first region of the plasmon generator is prevented from being receded from the air-bearing surface, and near-field light is allowed to be efficiently generated. Consequently, magnetic recording with higher density is made possible and increase in product lifetime is also expected.

Here, the second region desirably includes a channel section located forward of the metallic layer, and a minimum width of the channel section is desirably smaller than a width in a track-width direction of the first region. This is because the first region is surely prevented from being receded from the air-bearing surface. In particular, a minimum cross-sectional area of the channel section is preferably smaller than a minimum cross-sectional area in the track-width direction of the first region. In addition, the volume of the second region is desirably greater than the volume of the first region, and for example, a width in the track-width direction of the metallic layer is desirably greater than a width in the track-width direction of the first region. The first metallic material is preferably configured of one or more elements selected from a group consisting essentially of Au, Ag, and Cu, and the second metallic material is preferably configured of one or more elements selected from a group consisting essentially of Mo, Rh, Ru, Ta, Zr, Ir, Nb, Os, Pd, Pt, Ti, V, and W. Further, a thickness of the metallic layer is preferably thinner than a thickness of the second region, and the metallic layer preferably fills the part of the second region until the middle of the depth direction toward the waveguide. This is because, in this case, decrease in an area where the second region and the waveguide face to each other is avoided, and thus evanescent coupling between the second region and the waveguide is promoted, and surface plasmons are sufficiently generated in the second region.

DETAILED DESCRIPTION OF THE PREFERRED EMBODIMENTS

Hereinafter, a preferred embodiment of the invention will be described in detail with reference to drawings.

[1. Configuration of Magnetic Disk Unit]

First, referring to FIG. 1 and FIG. 2, a configuration of a magnetic disk unit according to an embodiment of the invention will be described below.

Figure 1:
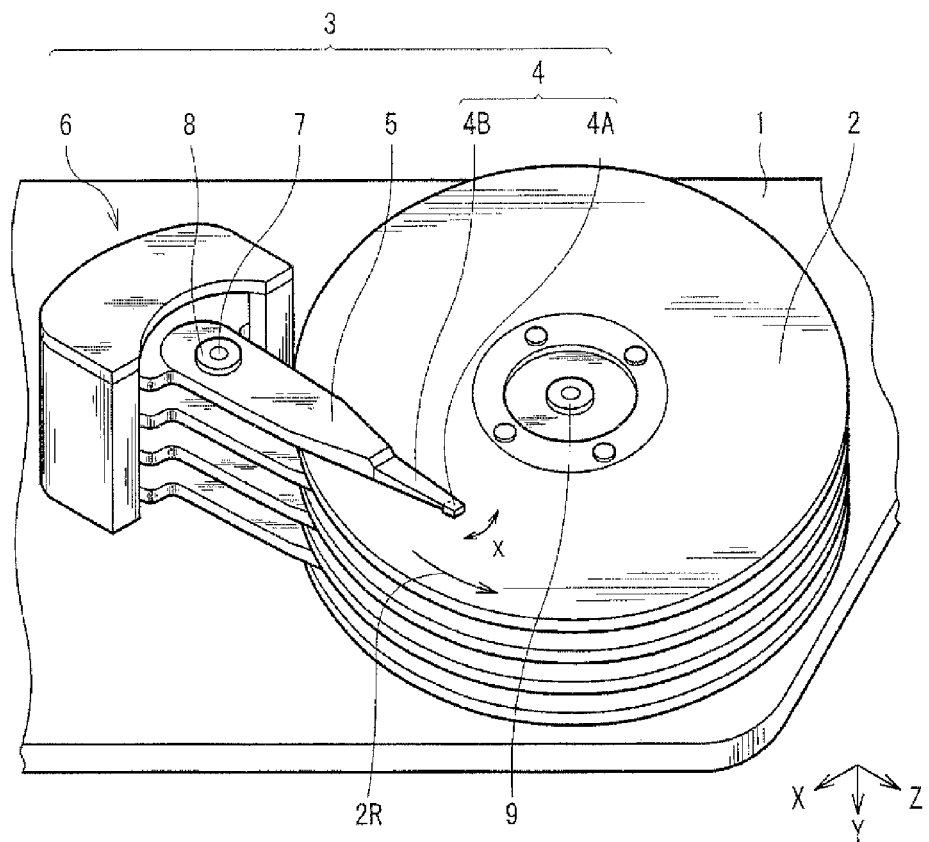
FIG. 1 is a perspective view illustrating a configuration of a magnetic disk unit provided with a magnetic read write head according to an embodiment of the invention.

FIG. 1 is a perspective view illustrating an internal configuration of the magnetic disk unit as the present embodiment. The magnetic disk unit adopts a load-unload system as a driving system, and includes, for example, in a housing 1, a magnetic disk 2 as a magnetic recording medium in which information is to be written, and a Head Arm Assembly (HAA) 3 for writing information in the magnetic disk 2 and reading the information. The HAA 3 includes a Head Gimbal Assembly (HGA) 4, an arm 5 supporting a base of the HGA 4, and a driver 6 as a power source for allowing the arm 5 to pivot. The HGA 4 includes a thermally-assisted magnetic head device (hereinafter, simply referred to as a "magnetic head device") 4A having a side surface provided with a magnetic read write head 10 (described later) according to the present embodiment, and a suspension 4B having an end provided with the magnetic head device 4A. The arm 5 supports the other end of the suspension 4B (an end opposite to the end provided with the magnetic head device 4A). The arm 5 is so configured as to be pivotable, through a bearing 8, around a fixed shaft 7 fixed to the housing 1. The driver 6 is configured of, for example, a voice coil motor. Incidentally, the magnetic disk unit has one or a plurality of (FIG. 1 exemplifies the case of four) magnetic disks 2, and the magnetic head device 4A is disposed corresponding to recording surfaces (a front surface and a back surface) of each of the magnetic disks 2. Each of the magnetic head devices 4A is movable in a direction across write tracks, that is, in a track-width direction (in an X-axis direction) in a plane parallel to the recording surface of each of the magnetic disks 2. On the other hand, the magnetic disk 2 rotates around a spindle motor 9 fixed to the housing 1 in a rotation direction 2R substantially orthogonal to the X-axis direction. With the rotation of the magnetic disk 2 and the movement of the magnetic head device 4A, information is written into the magnetic disk 2 or recorded information is read out. Further, the magnetic disk unit has a control circuit (described later) that controls a write operation and a read operation of the magnetic read write head 10, and controls an emission operation of a laser diode as a light source that generates laser light used for thermally-assisted magnetic recording described later.

Figure 2:
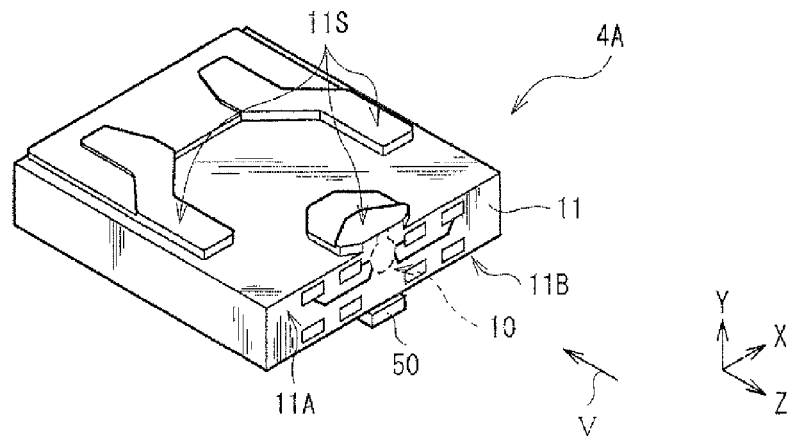
FIG. 2 is a perspective view illustrating a configuration of a slider in the magnetic disk unit illustrated in FIG. 1.

FIG. 2 illustrates a configuration of the magnetic head device 4A illustrated in FIG. 1. The magnetic head device 4A has a block-shaped slider 11 formed of, for example, $Al_2O_3$.TiC (AlTiC). The slider 11 is substantially formed as a hexahedron, for example, and one surface thereof corresponds to an ABS 11S that is disposed in proximity to and to face the recording surface of the magnetic disk 2. When the magnetic disk unit is not driven, namely, when the spindle motor 9 is stopped and the magnetic disk 2 does not rotate, the magnetic head device 4A is pulled off to the position away from an above part of the magnetic disk 2 (unload state), in order to avoid contact of the ABS 11S and the recording surface. In contrast, when the magnetic disk unit is initiated, the magnetic disk 2 starts to rotate at a high speed by the spindle motor 9, the arm 5 is pivotably moved around the fixed shaft 7 by the driver 6, and therefore, the magnetic head device 4A moves above the front surface of the magnetic disk 2, thereby being in a load state. The rotation of the magnetic disk 2 at a high speed causes air flow between the recording surface and the ABS 11S, and lift force caused by the air flow leads to a state where the magnetic head device 4A floats to maintain a certain distance (magnetic spacing) along a direction (a Y-axis direction) orthogonal to the recording surface. In addition, on an element forming surface 11A that is one side surface orthogonal to the ABS 11S, the magnetic read write head 10 is provided. Incidentally, on a surface 11B opposite to the ABS 11S of the slider 11, a light source unit 50 is provided near the magnetic read write head 10.

[2. Detailed Structure of Magnetic Read Write Head]

Next, the magnetic read write head 10 is described in more detail with reference to FIG. 3 to FIG. 6.

Figure 3:
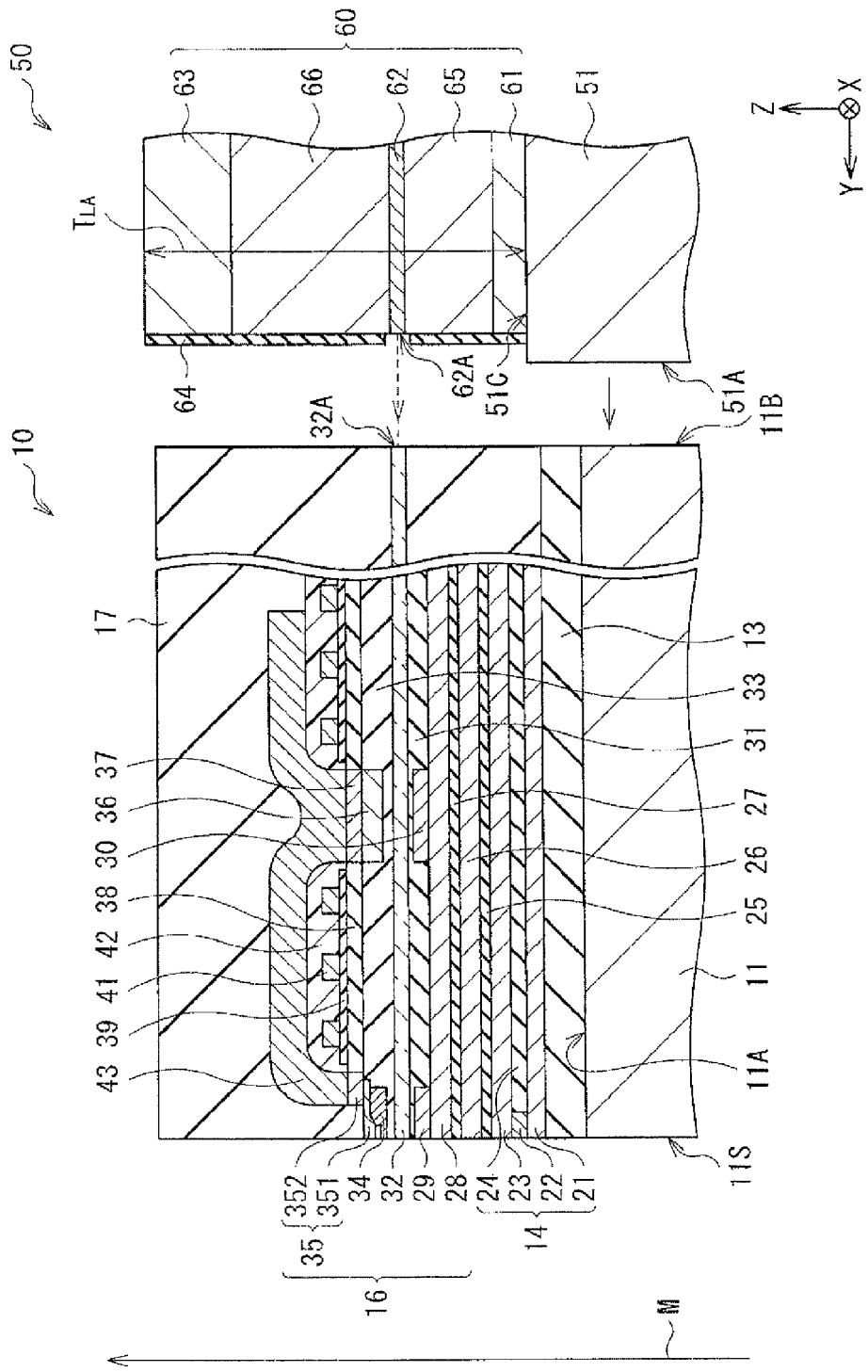
FIG. 3 is a sectional view illustrating a structure of a cross-sectional surface (YZ cross-sectional surface) orthogonal to an air-bearing surface, of the magnetic read write head illustrating in FIG. 2.
Figure 4:
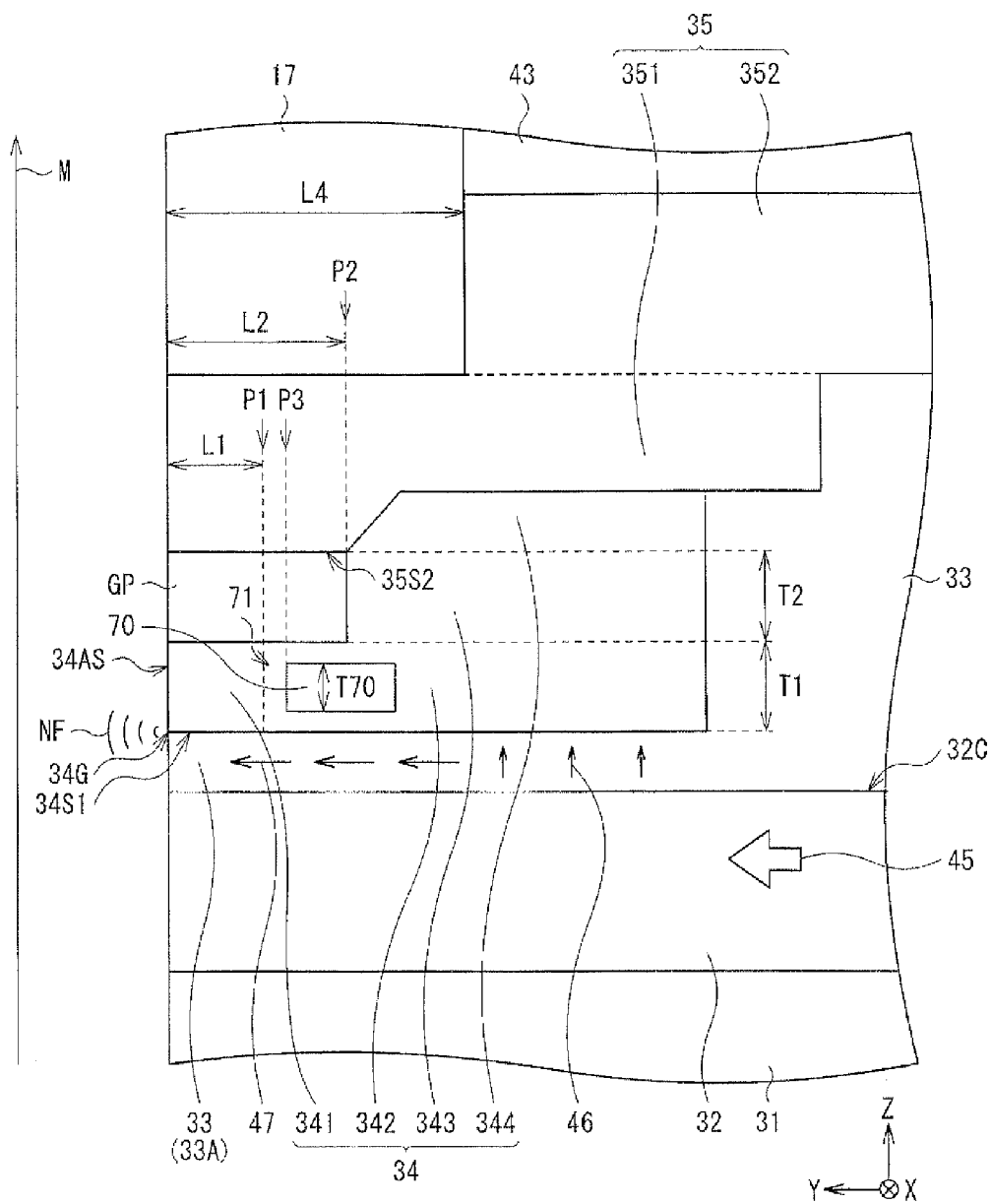
FIG. 4 is a sectional view illustrating a main part of the magnetic read write head illustrated in FIG. 3 in an enlarged manner.
Figure 5:
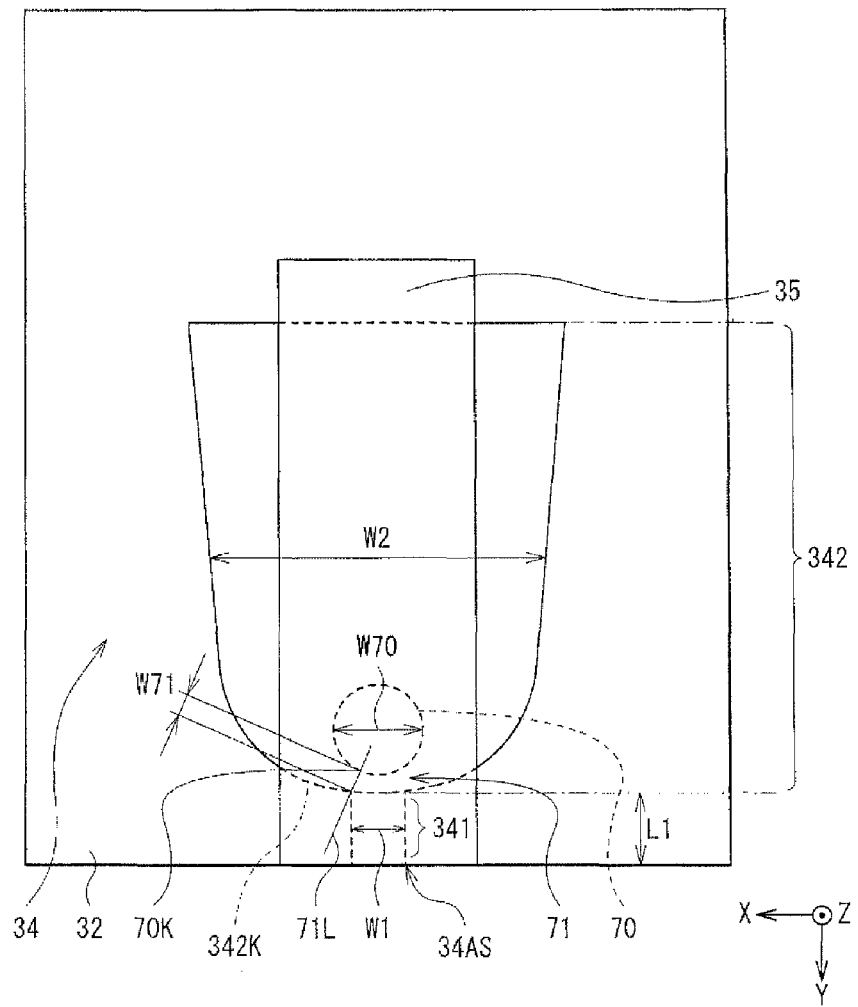
FIG. 5 is a schematic diagram illustrating a shape in an XY plane of the main part of the magnetic read write head.
Figure 6:
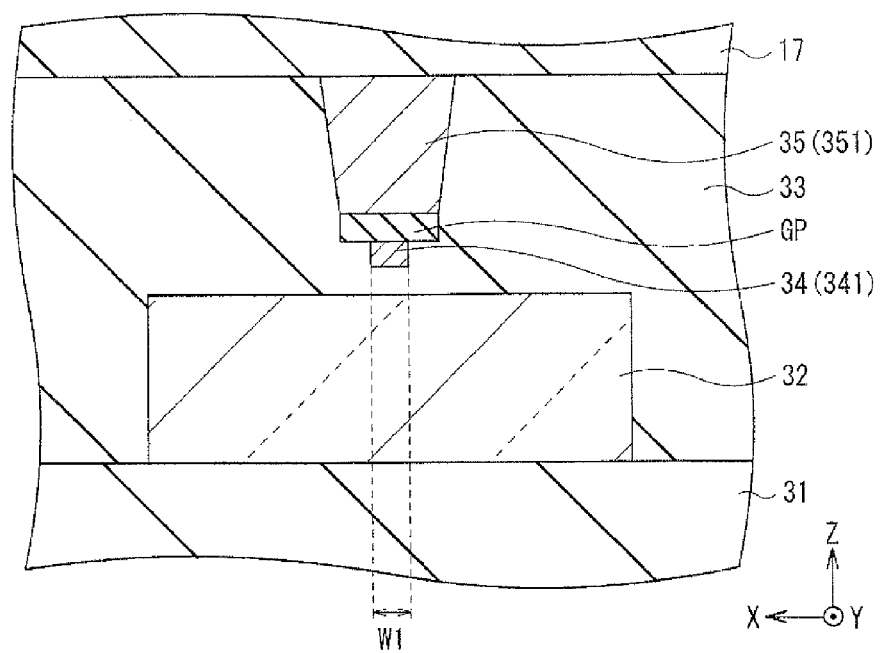
FIG. 6 is a schematic diagram illustrating a structure of an end surface exposed on the air-bearing surface, of the main part of the magnetic read write head.

FIG. 3 is a sectional view of the magnetic read write head 10 illustrated in FIG. 2, in the YZ cross-sectional surface orthogonal to the ABS 11S, and FIG. 4 is an enlarged sectional view illustrating a part of FIG. 3 in an enlarged manner. FIG. 5 is a schematic diagram illustrating a planar structure of a main part of the magnetic read write head 10 viewed from an arrow V direction illustrated in FIG. 2. FIG. 6 illustrates a part of an end surface exposed on the ABS 11S in an enlarged manner. Note that an up-arrow M illustrated in FIG. 3 and FIG. 4 indicates a direction in which the magnetic disk 2 moves relative to the magnetic read write head 10.

In the following description, dimensions in the X-axis direction, the Y-axis direction, and the Z-axis direction are referred to as a "width", a "height" or a "length", and a "thickness", respectively, and a closer side and a farther side to/from the ABS 11S in the Y-axis direction are referred to as "forward" and "backward", respectively. Moreover, a direction of the arrow M is referred to as a "trailing side", a direction opposite to the direction of the arrow M is referred to as a "leading side", and the X-axis direction and the Z-axis direction are referred to as a "cross track direction" and a "down track direction", respectively.

The magnetic read write head 10 has a stacked structure including an insulating layer 13, a read head section 14, a write head section 16, and a protective layer 17 that are stacked in order on the slider 11. Each of the read head section 14 and the write head section 16 has an end surface exposed on the ABS 11S.

The read head section 14 uses magneto-resistive effect (MR) to perform a read process. The read head section 14 is configured by stacking, for example, a lower shield layer 21, an MR element 22, and an upper shield layer 23 in this order on the insulating layer 13.

The lower shield layer 21 and the upper shield layer 23 are respectively formed of a soft magnetic metallic material such as NiFe (nickel iron alloy), and are disposed to face each other with the MR element 22 in between in the stacking direction (in the Z-axis direction). As a result, these layers each exhibit a function to protect the MR element 22 from the influence of an unnecessary magnetic field.

One end surface of the MR element 22 is exposed on the ABS 11S, and the other end surfaces thereof are in contact with an insulating layer 24 filling a space between the lower shield layer 21 and the upper shield layer 23. The insulating layer 24 is formed of an insulating material such as $Al_2O_3$ (aluminum oxide), AlN (aluminum nitride), $SiO_2$ (silicon dioxide), and DLC (diamond-like carbon).

The MR element 22 functions as a sensor for reading magnetic information written in the magnetic disk 2. The MR element 22 is, for example, a CPP (Current Perpendicular to Plane)-GMR (Giant Magnetoresistive) element whose sense current flows inside thereof in a stacking direction. In this case, the lower shield layer 21 and the upper shield layer 23 each function as an electrode to supply the sense current to the MR element 22.

In the read head section 14 with such a structure, a magnetization direction of a free layer (not illustrated) included in the MR element 22 changes depending on a signal magnetic field from the magnetic disk 2. Thus, the magnetization direction of the free layer shows a change relative to a magnetization direction of a pinned layer (not illustrated) also included in the MR element 22. When the sense current flows through the MR element 22, the relative change of the magnetization direction appears as the change of the electric resistance, and thus, the signal magnetic field is detected with use of the change and the magnetic information is accordingly read out.

On the read head section 14, an insulating layer 25, an intermediate shield layer 26, and an insulating layer 27 are stacked in order. The intermediate shield layer 26 functions to prevent the MR element 22 from being affected by a magnetic field that is generated in the write head section 16, and is formed of, for example, a soft magnetic metallic material such as NiFe. The insulating layers 25 and 27 are formed of the similar material to that of the insulating layer 24, for example.

The write head section 16 is a perpendicular magnetic write head performing a writing process of thermally-assisted magnetic recording system. The write head section 16 has, for example, a lower yoke layer 28, a leading shield 29 and a connecting layer 30, a cladding layer 31, a waveguide 32, and a cladding layer 33 in order on the insulating layer 27. Note that the leading shield 29 may be omitted from the structure.

The lower yoke layer 28, the leading shield 29, and the connecting layer 30 are each formed of a soft magnetic metallic material such as NiFe. The leading shield 29 is located at the frontmost end of the upper surface of the lower yoke layer 28 in such a manner that one end surface thereof is exposed on the ABS 11S. The connecting layer 30 is located backward of the leading shield 29 on the upper surface of the lower yoke layer 28.

The cladding layer 31 is provided so as to cover the lower yoke layer 28, the leading shield 29, and the connecting layer 30.

The waveguide 32 provided on the cladding layer 31 extends in a direction (the Y-axis direction) orthogonal to the ABS 11S, one end surface thereof is exposed on the ABS 11S, and the other end surface thereof is exposed at the backward thereof, for example. Note that the forward end surface of the waveguide 32 may be located at a position receded from the ABS 11S without being exposed on the ABS 11S. The waveguide 32 is formed of a dielectric material allowing laser light to pass therethrough. Specifically, the waveguide 32 may be formed of a material essentially containing one or more of, for example, SiC, DLC, TiOx (titanium oxide), TaOx (tantalum oxide), SiNx (silicon nitride), $SiO_xN_y$ (silicon oxynitride), Si (silicon), zinc selenide (ZnSe), NbOx (niobium oxide), GaP (gallium phosphide), ZnS (zinc sulfide), ZnTe (zinc telluride), CrOx (chromium oxide), FeOx (iron oxide), CuOx (copper oxide), SrTiOx (strontium titanate), BaTiOx (barium titanate), Ge (germanium), and C (diamond). Essentially containing means that the above-described materials are contained as main components, and other materials may be contained as subcomponents (for example, impurity) as long as having a refractive index higher than those of the cladding layers 31 and 33. The waveguide 32 allows laser light from a laser diode 60 (described later) to propagate toward the ABS 11S. Incidentally, although the cross-sectional shape of the waveguide 32 parallel to the ABS 11S is rectangular as illustrated in FIG. 6, for example, it may have other shapes.

The cladding layers 31 and 33 are each formed of a dielectric material having a refractive index, with respect to laser light propagating through the waveguide 32, lower than that of the waveguide 32. The cladding layers 31 and 33 may be formed of a material essentially containing one or more of, for example, SiOx (silicon oxide), $Al_2O_3$ (aluminum oxide), AlN (aluminum nitride), BeO (berylium oxide), SiC (silicon carbide), and DLC (diamond-like carbon). Essentially containing means that the above-described materials are contained as main components, and the other materials may be contained as subcomponents (for example, impurity) as long as having a refractive index lower than that of the waveguide 32.

The write head section 16 further includes a plasmon generator 34 provided above the forward end of the waveguide 32 with the cladding layer 33 in between, and a magnetic pole 35 provided above the plasmon generator 34.

The plasmon generator 34 includes a first region 341 and a second region 342 located backward thereof. The first region 341 includes an end surface 34AS exposed on the ABS 11S. The second region 342 is coupled with, at a position P1, the other end of the first region 341 opposite to the ABS 11S and has a volume greater than that of the first region 341, for example.

The first region 341 extends backward from the ABS 11S to the position P1 over a length L1 while maintaining a constant area of a cross-sectional surface (see FIG. 6) parallel to the ABS 11S. The position P1 is a position of a boundary between the first region 341 and the second region 342. The length L1 of the first region 341 is preferably 40 nm or more and 100 nm or less, for example. In addition, a thickness T1 of the first region 341 is, for example, 10 nm or more and 80 nm or less.

The second region 342 has, as illustrated in FIG. 5, width W2 larger than a width W1 of the first region 341. The thickness of the second region 342 is equal to the thickness of the first region 341, for example. The second region 342 is coupled with the first region 341 at the position P1 and extends backward.

The material of the plasmon generator 34 may be a metallic material (hereinafter, referred to as a first metallic material) containing one or more of, for example, Pd (palladium), Pt (platinum), Rh (rhodium), Ir (iridium), Ru (ruthenium), Au (gold), Ag (silver), Cu (copper), and aluminum (Al). Among them, Au, Ag and Cu are more preferable, and Au is most preferable. This is because it is excellent in chemical stability, and more efficiently generates near-field light NF (described later). Note that the material of the first region 341 is desirably the same as that of the second region 342. This is to efficiently generate the near-field light NF. In addition, this is to avoid complication in manufacturing.

The first region 341 of the plasmon generator 34 is distanced from a first layer 351 (described later) of the magnetic pole 35, and a gap layer GP is provided therebetween. The gap layer GP has an end exposed on the ABS 11S, and for example, extends backward from the ABS 11S to the position P2 located backward of the position P1 over the length L2. For example, the gap layer GP is essentially formed of one or more dielectric materials selected from $SiO_2$, $Al_2O_3$, MgO, ZnO, TaSiO, $MgF_2$, SiON, AlON, and ITO. With such a gap layer GP provided, the first region 341 is surrounded by the cladding layer 33, and is distanced from the forward end of the waveguide 32 and the forward end of the first layer 351 of the magnetic pole 35. A thickness T2 of the gap layer GP is, for example, 10 nm or more and 50 nm or less.

A space located backward of the gap layer GP is occupied by a third region 343 that configures a part of the plasmon generator 34. The third region 343 is provided so as to cover at least a part of the second region 342, and a forward end surface of the third region 343 is in contact with a backward end surface of the gap layer GP at the position P2. A fourth region 344 is further provided on the third region 343. For example, the fourth region 344 extends backward from the position P2, and covers a part or all of the third region 343. In this way, the second to fourth regions 342 to 344 that have a volume sufficiently greater than a volume of the first region 341 having one end exposed on the ABS 11S function as a heatsink efficiently dissipating heat generated by the plasmon generator 34 during operation.

A metallic layer 70 fills the part of the second region 342 of the plasmon generator 34. The metallic layer 70 extends backward from a position P3 between the position P1 and the position P2. Note that FIG. 4, FIG. 5, and the like illustrate only one metallic layer 70, however, two or more metallic layers 70 may be provided. The metallic layer 70 is essentially formed of a metallic material (hereinafter, referred to as a second metallic material) having a melting temperature higher than that of the first metallic material configuring the plasmon generator 34. For example, the second metallic material is configured of one or more elements selected from a group consisting of Mo (molybdenum), Rh (rhodium), Ru (ruthenium), Ta (tantalum), Zr (zirconium), Ir (iridium), Nb (niobium), Os (osmium), Pd (palladium), Pt (platinum), Ti (titanium), V (vanadium), and W (tungsten). Among them, Mo, Rh, Ru, Ta, and Zr are suitable for the case where Au is used as the constituent element of the plasmon generator 34.

This is because Mo, Rh, Ru, Ta, and Zr are elements less causing interdiffusion with Au. Among them, Mo, Rh, and Ru are more suitable because these are high in thermal conductivity and superior in heat dissipation property.

In addition, a thickness T70 of the metallic layer 70 is preferably smaller than the thickness T1 of the second region 342, and the metallic layer 70 preferably fills the part of the second region until the middle of the depth direction toward the waveguide 32. In other words, desirably, the metallic layer 70 is not exposed on a surface plasmon exciting surface 34S1 (described later) of the second region 342 facing the waveguide 32. With this structure, decrease in an area where the second region 342 and the waveguide 32 face to each other is avoided so that evanescent coupling is promoted between the second region 342 and the waveguide 32, and surface plasmons are sufficiently generated in the second region 342.

In the second region 342, a channel section 71 is formed forward of the metallic layer 70 by presence of the metallic layer 70. The channel section 71 is a gap section between the metallic layer 70 and an outer edge 342K of the second region 342 in the vicinity of the first region 341. A minimum width of the channel section 71 is preferably smaller than the width W1 in a track-width direction of the first region 341. For example, the minimum width of the channel section 71 is a width W71 along a straight line 71L in FIG. 5, and corresponds to a distance between an outer edge 70K of the metallic layer 70 and the outer edge 342K of the second region 342 at a position where both are closest to each other. In particular, a minimum cross-sectional area of the channel section 71 (an area of a cross-sectional surface orthogonal to a stacked surface, along the straight line 71L) is preferably smaller than a minimum cross-sectional area along the track-width direction of the first region 341. In addition, the width W70 in the track-width direction of the metallic layer 70 is larger than the width W1 of the first region 341, for example.

The magnetic pole 35 has a structure in which the first layer 351 and a second layer 352 are stacked in order on the plasmon generator 34. The first layer 351 has an end surface 35S1 exposed on the ABS 11S, and a counter surface 35S2 that faces the first region 341 of the plasmon generator 34 with the gap layer GP in between. The counter surface 35S2 is in contact with, for example, the entire upper surface of the gap layer GP.

The second layer 352 extends backward from a position receded from the ABS 11S by a length L4 (>L1). Both of the first layer 351 and the second layer 352 are formed of, for example, a magnetic material with high saturation flux density such as iron-based alloy. Examples of the iron-based alloy include FeCo (iron cobalt alloy), FeNi (iron nickel alloy), and FeCoNi (iron cobalt nickel alloy). Incidentally, although a cross-sectional shape of the first layer 351 parallel to the ABS 11S is, for example, an inverted trapezoid as illustrated in FIG. 6, may be other shapes.

The plasmon generator 34 generates the near-field light NF from the ABS 11S, based on the laser light that has propagated through the waveguide 32. The magnetic pole 35 stores therein magnetic flux generated in a coil 41 (described later), releases the magnetic flux from the ABS 11S, thereby generating a write magnetic field for writing magnetic information into the magnetic disk 2. The plasmon generator 34 and the first layer 351 are embedded in the cladding layer 33.

As illustrated in FIG. 3, the write head section 16 further includes a connecting layer 36 embedded in the cladding layer 33 at backward of the plasmon generator 34 and the magnetic pole 35, and a connecting layer 37 provided to be in contact with an upper surface of the connecting layer 36. The connecting layers 36 and 37 are located above the connecting layer 30 and are formed of a soft magnetic metallic material such as NiFe. Note that the connecting layer 36 is magnetically connected by a connection section (not illustrated) formed of, for example, a soft magnetic metallic material such as NiFe.

As illustrated in FIG. 3, on the cladding layer 33, an insulating layer 38 is provided to fill surroundings of the second layer 352 of the magnetic pole 35. An insulating layer 39 and the coil 41 that is formed in spiral around the connecting layer 37 are stacked in order on the insulating layer 38. The coil 41 is intended to generate recording-use magnetic flux by a write current flowing through itself, and is formed of a high conductive material such as Cu (copper) and Au (gold). The insulating layers 38 and 39 are formed of an insulating material such as $Al_2O_3$, AlN, $SiO_2$, and DLC. The insulating layer 38, the insulating layer 39, and the coil 41 are covered with an insulating layer 42, and further, an upper yoke layer 43 is so provided as to cover the insulating layer 42. The insulating layer 42 is formed of, for example, a non-magnetic insulating material flowing during being heated, such as a photoresist or a spin on glass (SOG). The insulating layers 38, 39, and 42 electrically separate the coil 41 from its surroundings. The upper yoke layer 43 is formed of a soft magnetic material with high saturation flux density such as CoFe, the forward section thereof is connected to the second layer 352 of the magnetic pole 35, and a part of the backward section is connected to the connecting layer 37. In addition, the forward end surface of the upper yoke layer 43 is located at a position receded from the ABS 11S.

In the write head section 16 having such a structure, by the write current flowing through the coil 41, magnetic flux is generated inside a magnetic path that is mainly configured by the leading shield 29, the lower yoke layer 28, the connecting layers 30, 36, and 37, the upper yoke layer 43, and the magnetic pole 35. Accordingly, a signal magnetic field is generated near the end surface of the magnetic pole 35 exposed on the ABS 11S, and the signal magnetic field reaches a predetermined region of the recording surface of the magnetic disk 2.

Further, in the magnetic read write head 10, for example, the protective layer 17 formed of a material similar to that of the cladding layer 33 is so formed as to cover the entire upper surface of the write head section 16. In other words, the cladding layer 33 and the protective layer 17 that are each formed of a material having a lower refractive index and higher thermal conductivity compared with the waveguide 32 are so provided as to collectively surround the waveguide 32, the plasmon generator 34, and the magnetic pole 35.

[3. Outline of Method of Manufacturing Magnetic Read Write Head]

Figure 7:
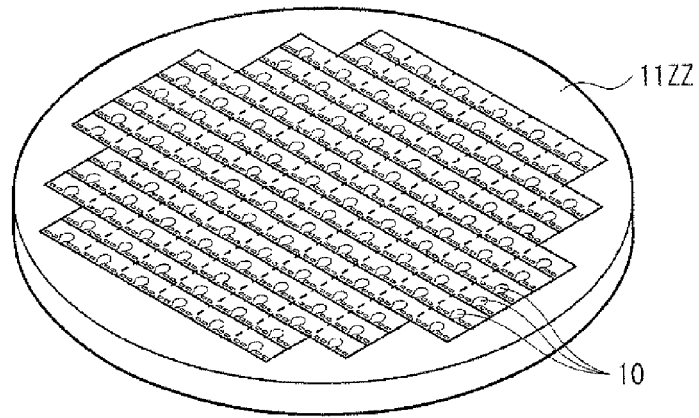
FIG. 7 is a perspective view illustrating one process in a method of manufacturing the magnetic read write head illustrated in FIG. 1.
Figure 8:
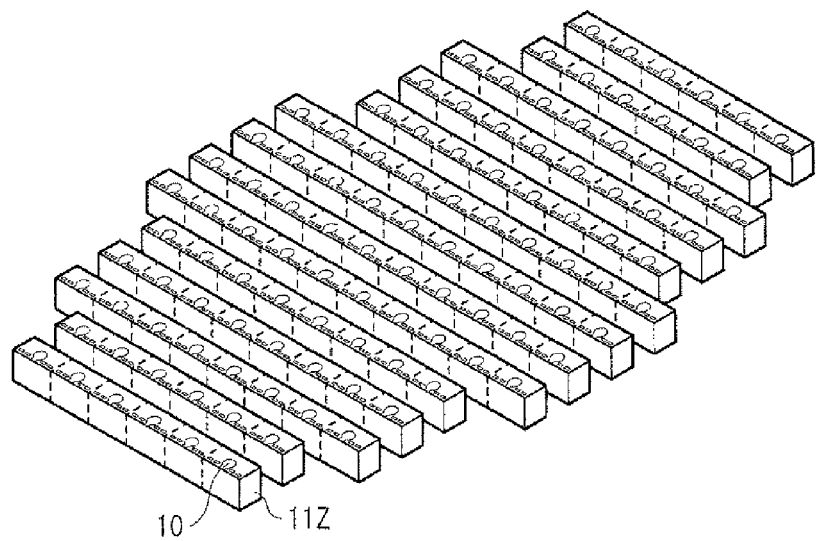
FIG. 8 is a perspective view illustrating one process following the process of FIG. 7.

Next, with reference to FIG. 7 and FIG. 8 in addition to FIG. 4, outline of a method of manufacturing the magnetic read write head 10 will be described. FIG. 7 and FIG. 8 are perspective views each illustrating one process of the method of manufacturing the magnetic read write head 10.

First, as illustrated in FIG. 7, a wafer 11ZZ formed of, for example. AlTiC is prepared. The wafer 11ZZ is to be a plurality of sliders 11 finally. After that, a plurality of magnetic read write head 10 are formed in array on the wafer 11ZZ in the following way.

The magnetic read write head 10 is manufactured mainly by sequentially forming and stacking a series of components by using an existing thin film process. Examples of the existing thin film process include film forming technique such as electrolytic plating and sputtering, patterning technique such as photolithography, etching technique such as dry etching and wet etching, and polishing technique such as chemical mechanical polishing (CMP).

In this case, first, the insulating layer 13 is formed on the wafer 11ZZ. Next, the lower shield layer 21, the MR element 22 and the insulating layer 24, and the upper shield layer 23 are formed by stacking in this order on the insulating layer 13 to form the read head section 14. Subsequently, the insulating layer 25, the intermediate shield layer 26, and the insulating layer 27 are stacked in order on the read head section 14.

After that, the lower yoke layer 28, the leading shield 29 and the connecting layer 30, the cladding layer 31, the waveguide 32, the cladding layer 33, the plasmon generator 34, the gap layer GP and the metallic layer 70, the magnetic pole 35, and the connecting layers 36 and 37 are formed in order on the insulating layer 27. Note that the structure from which the leading shield 29 may be omitted may be employed. Further, by performing a planarization process after the insulating layer 38 is formed so as to cover the entire surface, the upper surfaces of the magnetic pole 35, the insulating layer 38, and the connecting layer 37 are planarized, and the coil 41 embedded by the insulating layers 39 and 42 is then formed. Moreover, the upper yoke layer 43 connected with the magnetic pole 35 and the connecting layer 37 is formed to complete the write head section 16. After that, the protective layer 17 is formed on the write head section 16, and as a result, the plurality of magnetic read write heads 10 in a phase before formation of the ABS 11S are formed in an array on the wafer 11ZZ (FIG. 7).

After that, as illustrated in FIG. 8, the wafer 11ZZ is cut to form a plurality of bars 11Z. The plurality of magnetic read write heads 10 are formed in line in each of the bars 11Z. Further, one side surface of the bar 11Z, that is, a side surface of the stacked structure from the slider 11 to the protective layer 17 is collectively polished by CMP or the like to form the ABS 11S. At that time, it is formed so that the length L1 of the first region 341 of the plasmon generator 34 has a predetermined length. In addition, before formation of the ABS 11S, desirably, the laser light is allowed to enter the waveguide 32, and the near-field light NF is generated from a tip section 34G of the first region 341 to heat the first region 341, and agglomeration is generated in advance.

After the ABS 11S is formed, a protective film formed of a non-conductive material such as DLC may be formed so as to cover the entire ABS 11S.

[4. Method of Forming Gap Layer and Metallic Layer]

Figure 9:
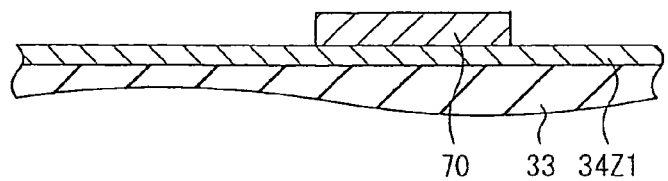
FIG. 9 is a sectional view illustrating one process in the method of manufacturing the magnetic read write head illustrated in FIG. 1.

Next, detail of a method of forming the gap layer GP and the metallic layer 70 will be described below with reference to FIG. 9 to FIG. 12. FIG. 9 to FIG. 12 are sectional views along the YZ plane orthogonal to the ABS 11S. First, as illustrated in FIG. 9, a metallic pattern 34Z1 that is to be lower layer sections of the first region 341 and the second region 342 of the plasmon generator 34 is collectively formed on the cladding layer 33 with use of the first metallic material. Note that the lower layer section of the first region 341 and the lower layer section of the second region 342 may be formed individually. Next, the metallic layer 70 is selectively formed at a predetermined position in a region that is to be the lower layer section of the second region 342 in the metallic pattern 34Z1.

Figure 10:
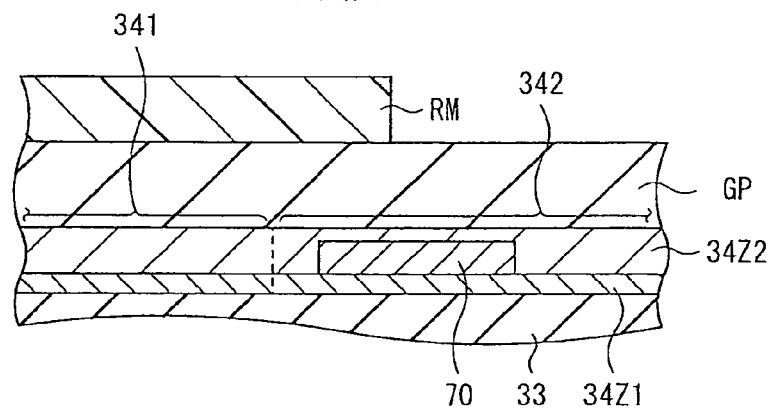
FIG. 10 is a sectional view illustrating one process following the process of FIG. 9.
Figure 11:
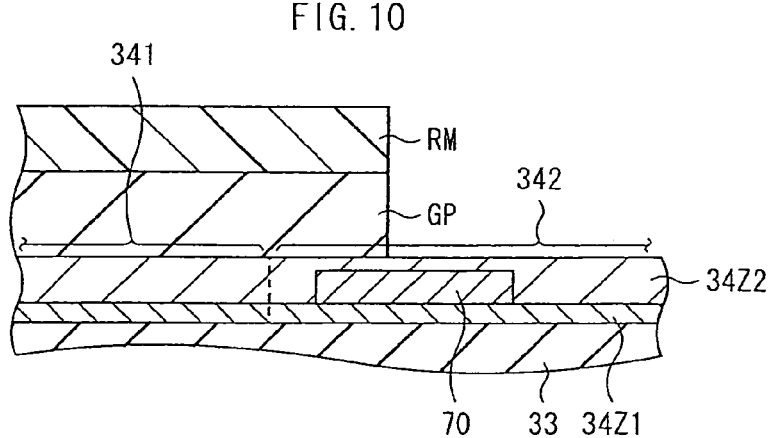
FIG. 11 is a sectional view illustrating one process following the process of FIG. 10.

After the metallic layer 70 is formed, as illustrated in FIG. 10, a metallic pattern 34Z2 that is to be upper layer sections of the first region 341 and the second region 342 is formed so as to cover the metallic pattern 34Z1 and the metallic layer 70. As a result, the first region 341 and the second region 342 in which the metallic layer 70 is buried are formed. Further, the gap layer GP is formed with use of a predetermined dielectric material so as to cover the entire surface. Subsequently, a resist mask RM is selectively formed in a region of the gap layer GP corresponding to the entire first region 341 and the forward section of the second region 342. After that, as illustrated in FIG. 11, the resist mask RM is used as a mask to remove all of the gap layer GP in a region not covered with the resist mask RM. As a result, the backward section of the second region 342 is exposed.

Figure 12:
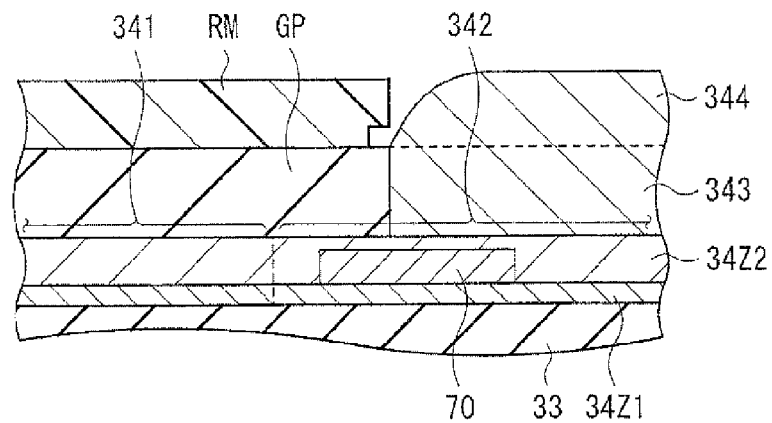
FIG. 12 is a sectional view illustrating one process following the process of FIG. 11.
Figure 13:
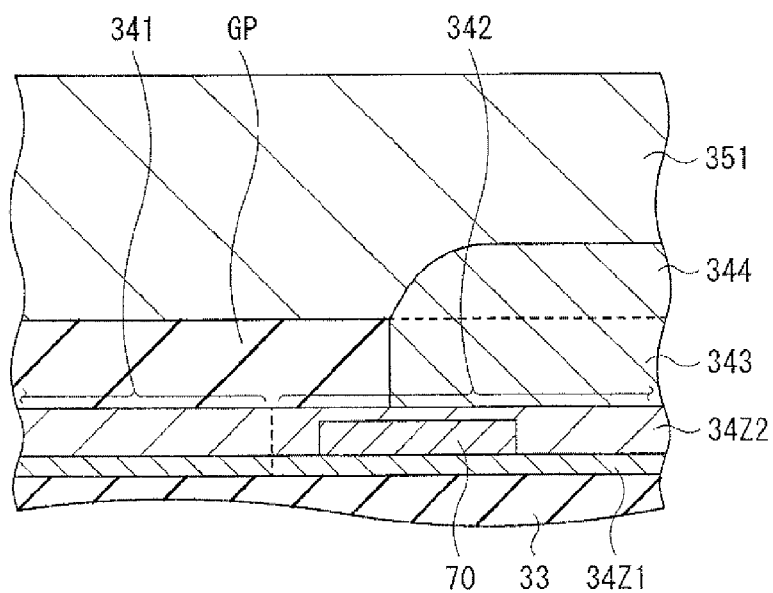
FIG. 13 is a sectional view illustrating one process following the process of FIG. 12.

Subsequently, as illustrated in FIG. 12, the third and fourth regions 343 and 344 of the plasmon generator 34 are sequentially formed so as to cover the exposed second region 342. After that, as illustrated in FIG. 13, the resist mask RM is removed, and the first layer 351 of the magnetic pole 35 is formed so as to cover the plasmon generator 34. Accordingly, it is possible to form the metallic layer 70 buried in the second region 342 and the gap layer GP located between the first region 341 and the first layer 351.

[5. Detailed Configuration of Light Source Unit]

The light source unit 50 is described in more detail with reference to FIG. 3 again. As illustrated in FIG. 3, the light source unit 50 provided backward of the magnetic read write head 10 includes the laser diode 60 as a light source emitting laser light, and, for example, a rectangular parallelepiped supporting member 51 supporting the laser diode 60.

The supporting member 51 is formed of, for example, a ceramic material such as $Al_2O_3$.TiC. As illustrated in FIG. 3, the supporting member 51 includes a bonded surface 51A to be bonded to a back surface 11B of the slider 11, and a light source mounting surface 51C orthogonal to the bonded surface 51A. The light source mounting surface 51C is parallel to the element forming surface 11A. The laser diode 60 is mounted on the light source mounting surface 51C. The supporting member 51 desirably has a function of a heatsink dissipating heat generated by the laser diode 60, in addition to the function to support the laser diode 60.

Laser diodes generally used for communication, for optical disc storage, or for material analysis, for example, InP-based, GaAs-based, or GaN-based one may be used as the laser diode 60. The wavelength of the laser light emitted from the laser diode 60 may be any value within the range of, for example, 375 nm to 1.7 μm both inclusive. Specifically, it may be a laser diode of InGaAsP/InP quaternary mixed crystal with the emission wavelength region of 1.2 to 1.67 μm both inclusive. As illustrated in FIG. 3, the laser diode 60 has a multilayer structure including a lower electrode 61, an active layer 62, and an upper electrode 63. For example, an n-type semiconductor layer 65 including n-type AlGaN is interposed between the lower electrode 61 and the active layer 62, and for example, a p-type semiconductor layer 66 including p-type AlGaN is interposed between the active layer 62 and the upper electrode 63. On each of two cleavage surfaces of the multilayer structure, a reflective layer 64 formed of $SiO_2$, $Al_2O_3$, or the like is provided to totally reflect light and excite oscillation. In the reflective layer 64, an opening for emitting laser light is provided at a position including an emission center 62A of the active layer 62. The relative positions of the light source unit 50 and the magnetic read write head 10 are fixed by bonding the bonded surface 51A of the supporting member 51 to the back surface 11B of the slider 11 in such a manner that the emission center 62A and the backward end surface 32A of the waveguide 32 are coincident with each other. The thickness $T_{LA}$ of the laser diode 60 is, for example, about 60 to 200 μm both inclusive. When a predetermined voltage is applied between the lower electrode 61 and the upper electrode 63, laser light is emitted from the emission center 62A of the active layer 62, and then enters the backward end surface 32A of the waveguide 32. The laser light emitted from the laser diode 60 is preferably polarized light of a TM mode whose electric field oscillates in a direction perpendicular to the surface of the active layer 62. The laser diode 60 may be driven with use of a power source in the magnetic disk unit. The magnetic disk unit generally includes a power source generating a voltage of about 5 V, for example, and the voltage generated by the power source is sufficient to drive the laser diode 60. In addition, the laser diode 60 consumes power of, for example, about several tens mW, which is sufficiently covered by the power source in the magnetic disk unit.

[6. Control Circuit of Magnetic Disk Unit and Operation]

Figure 14:
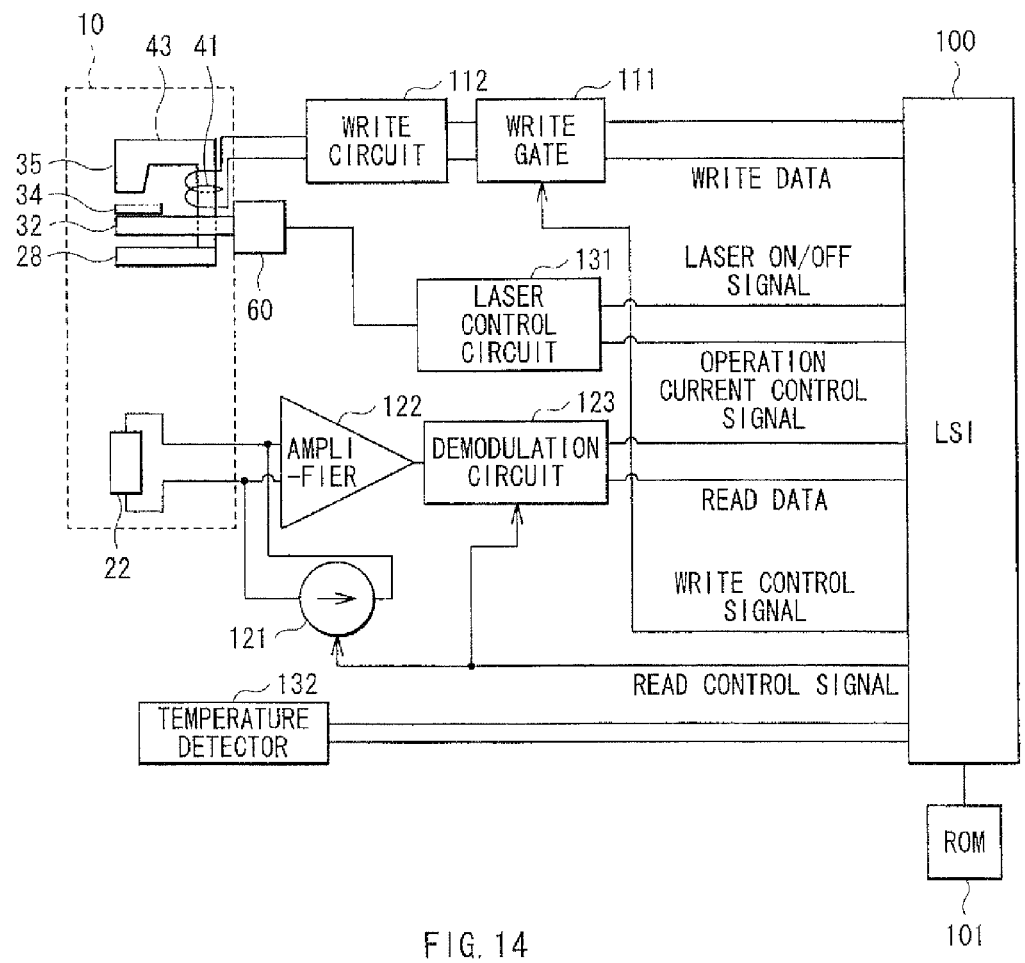
FIG. 14 is a block diagram illustrating a circuit configuration of the magnetic disk unit illustrated in FIG. 1.

With reference to FIG. 14, the circuit configuration of the control circuit of the magnetic disk unit illustrated in FIG. 1 and the operation of the magnetic read write head 10 will be described below. The control circuit includes a control LSI (large-scale integration) 100, a ROM (read only memory) 101 connected to the control LSI 100, a write gate 111 connected to the control LSI 100, and a write circuit 112 connecting the write gate 111 to the coil 41. The control circuit further includes a constant current circuit 121 connected to the MR element 22 and the control LSI 100, an amplifier 122 connected to the MR element 22, and a demodulation circuit 123 connected to the output end of the amplifier 122 and the control LSI 100. The control circuit further includes a laser control circuit 131 connected to the laser diode 60 and the control LSI 100, and a temperature detector 132 connected to the control LSI 100.

Here, the control LSI 100 provides write data and a write control signal to the write gate 111. Moreover, the control LSI 100 provides a read control signal to the constant current circuit 121 and the demodulation circuit 123, and receives read data output from the demodulation circuit 123. In addition, the control LSI 100 provides a laser ON/OFF signal and an operation current control signal to the laser control circuit 131.

The temperature detector 132 detects the temperature of the magnetic recording layer of the magnetic disk 2 to transmit information of the temperature to the control LSI 100. The ROM 101 holds a control table and the like to control an operation current value to be supplied to the laser diode 60. At the time of write operation, the control LSI 100 supplies the write data to the write gate 111. The write gate 111 supplies the write data to the write circuit 112 only when the write control signal instructs to perform the write operation. The write circuit 112 allows the write current to flow through the coil 41 according to the write data. As a result, the write magnetic field is generated from the magnetic pole 35, and data is written into the magnetic recording layer of the magnetic disk 2 by the write magnetic field.

At the time of read operation, the constant current circuit 121 supplies a constant sense current to the MR element 22 only when the read control signal instructs to perform the read operation. The output voltage of the MR element 22 is amplified by the amplifier 122, and is then received by the demodulation circuit 123. The demodulation circuit 123 demodulates the output of the amplifier 122 to generate read data to be provided to the control LSI 100 when the read control signal instructs to perform the read operation.

The laser control circuit 131 controls the supply of the operation current to the laser diode 60 based on the laser ON/OFF signal, and controls the value of the operation current supplied to the laser diode 60 based on the operation current control signal. The operation current equal to or larger than an oscillation threshold is supplied to the laser diode 60 by the control of the laser control circuit 131 when the laser ON/OFF signal instructs to perform the ON operation. As a result, the laser light is emitted from the laser diode 60 and then the laser light propagates through the waveguide 32. Subsequently, the near-field light NF (described later) is generated from the tip section 34G of the plasmon generator 34, a part of the magnetic recording layer of the magnetic disk 2 is heated by the near-field light NF, and thus the coercivity in that part is lowered. At the time of writing, the write magnetic field generated from the magnetic pole 35 is applied to the part of the magnetic recording layer with lowered coercivity, and therefore data recording is performed.

The control LSI 100 determines a value of the operation current of the laser diode 60 with reference to the control table stored in the ROM 101, based on the temperature of the magnetic recording layer of the magnetic disk 2 measured by the temperature detector 132 and the like, and controls the laser control circuit 131 with use of the operation current control signal in such a manner that the operation current of the value is supplied to the laser diode 60. The control table includes, for example, the oscillation threshold of the laser diode 60 and data indicating temperature dependency of light output-operation current property. The control table may further include data indicating a relationship between the operation current value and the increased amount of the temperature of the magnetic recording layer heated by the near-field light NF, and data indicating temperature dependency of the coercivity of the magnetic recording layer.

The control circuit illustrated in FIG. 14 has a signal system to control the laser diode 60, that is, a signal system of the laser ON/OFF signal and the operation current control signal, independent of the control signal system of write-read operation, and therefore, more various conduction modes to the laser diode 60 are achievable, in addition to the conduction to the laser diode 60 simply operated in conjunction with the write operation. Note that the configuration of the control circuit of the magnetic disk unit is not limited to that illustrated in FIG. 14.

Subsequently, a principle of near-field light generation in the present embodiment and a principle of thermally-assisted magnetic recording with use of the near-field light will be described with reference to FIG. 4.

Laser light 45 which has been emitted from the laser diode 60 propagates through the waveguide 32 to reach near the plasmon generator 34. At this time, the laser light 45 is totally reflected by an evanescent light generating surface 32C that is an interface between the waveguide 32 and a buffer section 33A (a section between the waveguide 32 and the plasmon generator 34, of the cladding layer 33), and therefore evanescent light 46 leaking into the buffer section 33A is generated. After that, the evanescent light 46 couples with charge fluctuation on a surface plasmon exciting surface 34S1 facing the waveguide 32, of the plasmon generator 34 to induce a surface plasmon polariton mode. As a result, surface plasmons 47 are excited on the surface plasmon exciting surface 34S1. The surface plasmons 47 propagate on the surface plasmon exciting surface 341 toward the ABS 11S.

The surface plasmons 47 eventually reach the ABS 11S, and as a result, the near-field light NF is generated on the tip section 34G. The near-field light NF is irradiated toward the magnetic disk 2 (not illustrated in FIG. 4) and reaches the surface of the magnetic disk 2 to heat a part of the magnetic recording layer of the magnetic disk 2. As a result, the coercivity at the heated part of the magnetic recording layer is lowered. In the thermally-assisted magnetic recording, with respect to the part of the magnetic recording layer with the coercivity thus lowered, data writing is performed by application of the write magnetic field generated by the magnetic pole 35.

[7. Effects]

In the magnetic read write head 10 of the present embodiment, as described above, the metallic layer 70 is buried in the predetermined position of the second region 342 coupled with the first region 341 that generates largest amount of heat in the plasmon generator 34. The second metallic material configuring the metallic layer 70 has a melting temperature higher than that of the first metallic material configuring the plasmon generator 34. The presence of the metallic layer 70 prevents the second region 342 from being pulled by the first region 341 and from being accordingly receded from the ABS 11S even when the volume of the first region 341 whose temperature becomes highest during operation is smaller than that of the second region 342. In addition, the metallic layer 70 itself is not agglomerated. Further, the peripheral section of the metallic layer 70 in the second region 342, for example, the channel section 71 remains at a temperature lower than the temperature of the first region 341, and thus is not agglomerated. On the other hand, since the first region 341 and the second region 342 are coupled with each other, surface plasmons that are generated by evanescent coupling between the second region 342 and the light propagating through the waveguide 32 efficiently propagate in the first region 341. Therefore, even when the temperature of the first region 341 is increased during operation, the first region 341 is prevented from being receded from the ABS 115, and the near-field light NF is allowed to be efficiently generated. Consequently, magnetic recording with higher density is made possible and increase in product lifetime is also expected.

In the present embodiment, in particular, the width W71 of the channel section 71 in the second region 342 is smaller than the width W1 of the first region 341, and thus the first region 341 is surely prevented from being receded from the ABS 11S. Further, the volume of the second region 342 is larger than that of the first region 341, and thus the heat generated in the first region 341 at the time of write operation is more efficiently dissipated, and high reliability is obtainable accordingly. Since the metallic layer 70 is not exposed on the surface plasmon exciting surface 34S1 of the second region 342 facing the waveguide 32, the evanescent coupling between the second region 342 and the waveguide 32 is not impaired, and thus the near-field light NF with higher intensity is allowed to be generated.

[8. Modification]

Figure 15:
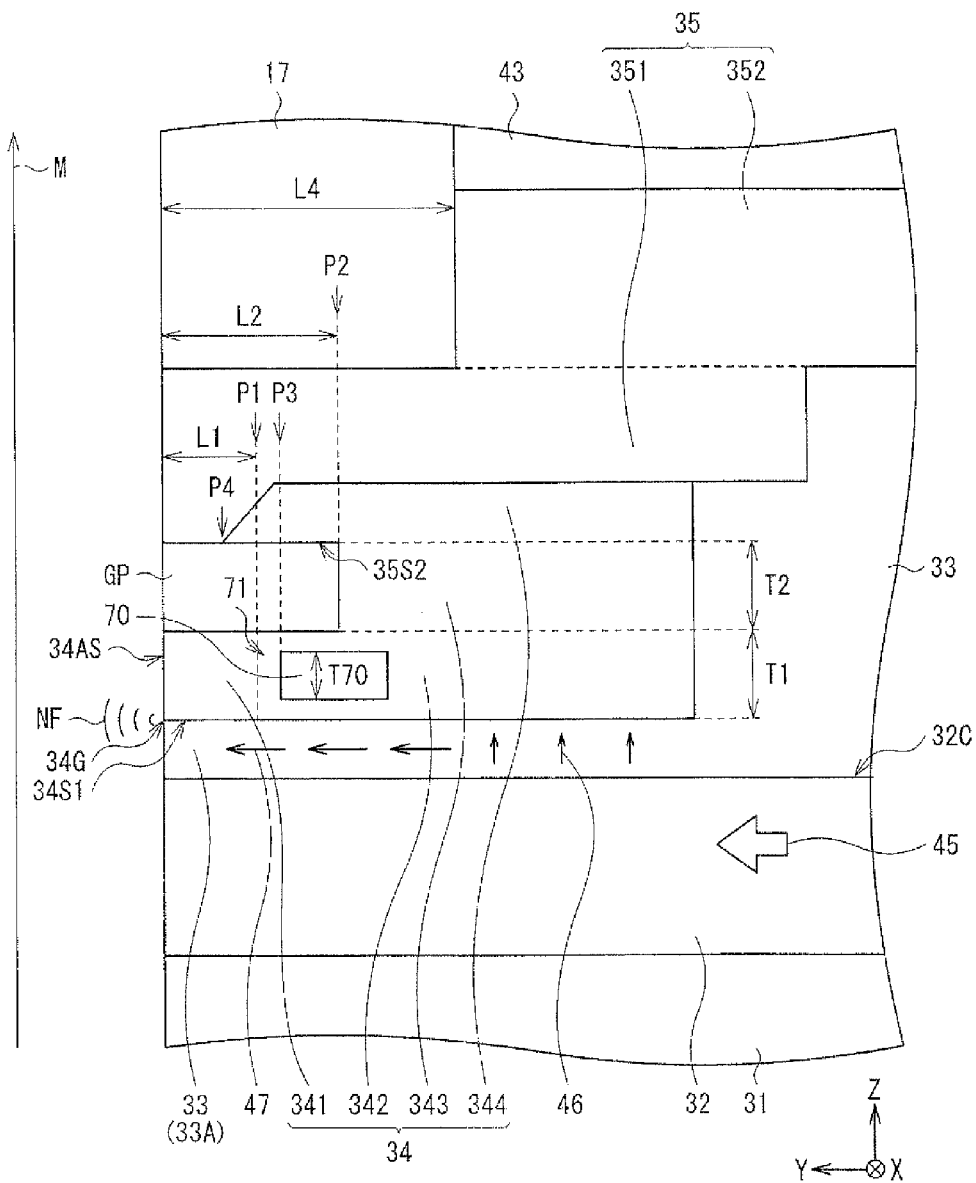
FIG. 15 is a sectional view illustrating a structure of a magnetic read write head according to a modification.

Next, a modification of the present embodiment is described with reference to FIG. 15. In the above-described embodiment, the case of the structure in which the entire upper surface of the gap layer GP is in contact with the counter surface 3552 of the magnetic pole 35 has been described. In contrast, in the present modification, a part of the plasmon generator 34 covers a part of the upper surface of the gap layer GP. Specifically, as illustrated in FIG. 15, in the present modification, the fourth region 344 of the plasmon generator 34 extends backward from a position P4 between the position P2 and the ABS 11S, and covers a part of the gap layer GP and at least a part of the third region 343. In other words, the forward region of the upper surface of the gap layer GP is in contact with the first layer 351 of the magnetic pole 35, and the backward region thereof is in contact with the fourth region 344.

In the present modification, in addition to the effects of the above-described embodiment, it is possible to obtain higher heat dissipation effect while suppressing spread of the near-field light NF by providing the fourth region 344 to be overlapped with the part of the gap layer GP.

EXAMPLES

Examples of the invention will be described.

Experimental Examples 1-1 to 1-4

As for the magnetic read write head 10 of the invention, a temperature on the magnetic disk and a temperature of the plasmon generator at the time when a write operation was performed with a predetermined power were measured, and relationship between the thickness T1 of the plasmon generator 34, the thickness T70 of the metallic layer 70, and the width W71 of the channel section 71 was examined. In this example, Au was used as the first metallic material configuring the plasmon generator 34, and Ru was used as the second metallic material configuring the metallic layer 70. In addition, the length L1 of the first region 341, the thickness T1 of the plasmon generator 34, the thickness T70 of the metallic layer 70, and the minimum width W71 of the channel section 71 were set as illustrated in Tale 1. Moreover, the width W1 of the first region 341 was set to 70 nm, and the length of the metallic layer 70 was set to 200 nm.

The results thereof are illustrated in Table 1. It was found from comparison between Experimental Example 1-1 and Experimental Example 1-2 that the larger thickness T1 of the plasmon generator 34 can suppress the temperature of the plasmon generator 34. In was found from comparison between Experimental Example 1-2 and Experimental Example 1-3 and comparison between Experimental Example 1-4 and Experimental Example 1-5 that the larger width W71 of the channel section 71 can suppress the temperature of the plasmon generator 34. Further, it was found from comparison between Experimental Example 1-2 and Experimental Example 1-4 that the smaller thickness T70 of the metallic layer 70 can suppress the temperature of the plasmon generator 34. It is understood that these results are derived from a difference between the thermal conductivity of Au configuring the plasmon generator 34 and the thermal conductivity of Ru configuring the metallic layer.

In addition, it is found from comparison between Experimental Example 1-3 and Experimental Example 1-6 that the smaller length L1 of the first region 341 can suppress the temperature of the plasmon generator 34. It is conceivable that higher heatsink effect by the second region 342 is obtained by making the first region 341 whose temperature becomes highest in the plasmon generator 34 shorter and providing the second region 342 that has a larger volume at a position closer to the ABS 11S.

TABLE 1

| EXPERIMENTAL EXAMPLE | L1 | T1 | T70 | W71 | PG TEMPERATURE/ MEDIUM TEMPERATURE |
|---|---|---|---|---|---|
| | nm | nm | nm | nm | — |
| 1-1 | 70 | 60 | 25 | 60 | 0.72 |
| 1-2 | 70 | 80 | 25 | 60 | 0.54 |
| 1-3 | 70 | 80 | 25 | 30 | 0.75 |
| 1-4 | 70 | 80 | 40 | 60 | 0.65 |
| 1-5 | 70 | 80 | 40 | 30 | 0.92 |
| 1-6 | 40 | 80 | 25 | 30 | 0.71 |

Hereinbefore, although the invention has been described with reference to the embodiment, the invention is not limited to the above-described embodiment, and various modifications may be made. For example, in the thermally-assisted magnetic recording head of the invention, the configurations (shapes, positional relationships, etc.) of the waveguide, the plasmon generator, the magnetic pole, and the like are not limited to those described in the above-described embodiment, and a thermally-assisted magnetic recording head having other structure may be employed.

Moreover, in the above-described embodiment, the metallic layer 70 is not in contact with the gap layer GP, however this is not limitative. The metallic layer 70 may be disposed so that the upper surface of the metallic layer 70 is made contact with the gap layer GP.

Figure 16A:
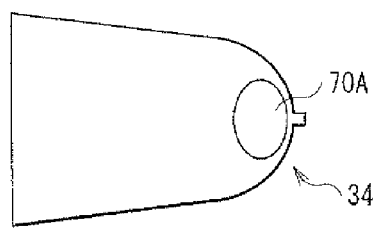
FIG. 16A is a schematic plan view illustrating a first modification related to a metallic layer in the magnetic read write head illustrated in FIG. 1.
Figure 16D:
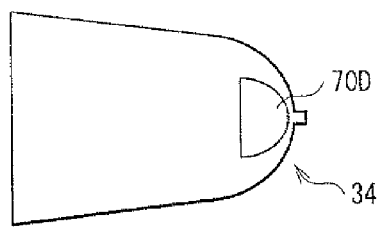
FIG. 16D is a schematic plan view illustrating a fourth modification related to the metallic layer in the magnetic read write head illustrated in FIG. 1.
Figure 16B:
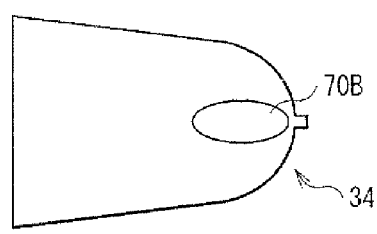
FIG. 16B is a schematic plan view illustrating a second modification related to the metallic layer in the magnetic read write head illustrated in FIG. 1.
Figure 16E:
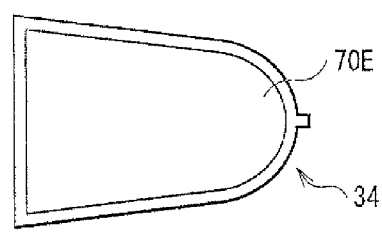
FIG. 16E is a schematic plan view illustrating a fifth modification related to the metallic layer in the magnetic read write head illustrated in FIG. 1.
Figure 16C:
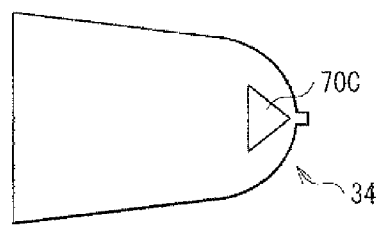
FIG. 16C is a schematic plan view illustrating a third modification related to the metallic layer in the magnetic read write head illustrated in FIG. 1.

Further, in the above-described embodiment, although the metallic layer 70 having the circular plane shape has been exemplified, the technology is not limited thereto. For example, an oval metallic layer 70A illustrated in FIG. 16A, an oval metallic layer 70B illustrated in FIG. 16B, a triangular metallic layer 70C illustrated in FIG. 16C, a semicircular metallic layer 70D illustrated in FIG. 16D, or a metallic layer 70E that has a shape following the profile of the second region 342 as illustrated in 16E may be employed.

The correspondence relationships between the reference numerals and the components of the present embodiment are collectively illustrated as follows. 1 . . . housing, 2 . . . magnetic disk, 3 . . . head arm assembly (HAA), 4 . . . head gimbal assembly (HGA), 4A . . . magnetic head device, 4B . . . suspension, 5 . . . arm, 6 . . . driver, 7 . . . fixed shaft, 8 . . . bearing, 9 . . . spindle motor, 10 . . . magnetic read write head, 11 . . . slider, 11A . . . element forming surface, 11B . . . back surface, 11S . . . air-bearing surface (ABS), 12 . . . element forming layer, 13 . . . insulating layer, 14 . . . read head section, 16 . . . write head section, 17 . . . protective layer, 21 . . . lower shield layer, 22 . . . MR element, 23 . . . upper shield layer, 24, 25, 27, 38, 39, 42 . . . insulating layer, 26 . . . intermediate shield layer, 28 . . . lower yoke layer, 29 . . . leading shield, 30, 36, 37 . . . connecting layer, 31, 33 . . . cladding layer, 32 . . . waveguide, 34 . . . plasmon generator, 341 to 344 . . . first to fourth regions, 34G . . . tip section, 34S1 . . . surface plasmon exciting surface, 35 . . . magnetic pole, 351 . . . first layer, 352 . . . second layer, 41 . . . coil, 43 . . . upper yoke layer, 45 . . . laser light, 46 . . . evanescent light, 47 . . . surface plasmon, 70 . . . metallic layer, 71 . . . channel section, 100 . . . LSI, 101 . . . ROM, 111 . . . write gate, 121 . . . constant current circuit, 122 . . . amplifier, 123 . . . demodulation circuit, 131 . . . laser control circuit, 132 . . . temperature detector, GP . . . gap layer, NF . . . near-field light.

What is claimed is:

1. A thermally-assisted magnetic recording head, comprising:
    a magnetic pole having an end exposed on an air-bearing surface;
    a waveguide;
    a plasmon generator formed essentially of a first metallic material, and having a first region and a second region, the first region extending backward from the air-bearing surface to a first position, and the second region being coupled with the first region at the first position and extending backward from the first position; and
    a metallic layer filling a part in the second region, and formed essentially of a second metallic material that has a higher melting temperature than a melting temperature of the first metallic material.

2. The thermally-assisted magnetic recording head according to claim 1, wherein
    the second region includes a channel section located forward of the metallic layer, and
    a minimum width of the channel section is smaller than a width in a track-width direction of the first region.

3. The thermally-assisted magnetic recording head according to claim 2, wherein
    a minimum cross-sectional area of the channel section is smaller than a minimum cross-sectional area in a track-width direction of the first region.

4. The thermally-assisted magnetic recording head according to claim 1, wherein a width in a track-width direction of the metallic layer is greater than a width in the track-width direction of the first region.

5. The thermally-assisted magnetic recording head according to claim 1, wherein a volume of the second region is greater than a volume of the first region.

6. The thermally-assisted magnetic recording head according to claim 1, wherein
    the first metallic material is configured of one or more elements selected from a group consisting essentially of Au, Ag, and Cu, and
    the second metallic material is configured of one or more elements selected from a group consisting essentially of Mo, Rh, Ru, Ta, Zr, Ir, Nb, Os, Pd, Pt, Ti, V, and W.

7. The thermally-assisted magnetic recording head according to claim 1, wherein
    a thickness of the metallic layer is thinner than a thickness of the second region, and
    the metallic layer fills the part of the second region until the middle of the depth direction toward the waveguide.

8. The thermally-assisted magnetic recording head according to claim 1, further comprising a gap layer provided between the magnetic pole and the first region and extending backward from the air-bearing surface to a second position that is located backward of the first position, and being made of a dielectric material, wherein
    the plasmon generator is provided between the magnetic pole and the waveguide, and
    the metallic layer extends backward from a third position that is located between the first position and the second position.

9. The thermally-assisted magnetic recording head according to claim 8, wherein the plasmon generator further includes a third region, the third region being in contact with a backward end face of the gap layer at the second position and covering a part of the second region.

10. The thermally-assisted magnetic recording head according to claim 9, wherein the plasmon generator further includes a fourth region, the fourth region extending backward from the second position and covering a part or all of the third region.

11. The thermally-assisted magnetic recording head according to claim 9, wherein the plasmon generator further includes a fourth region, the fourth region extending backward from a fourth position that is located between the second position and the air-bearing surface, and covering a part of the gap layer and a part or all of the third region.

12. The thermally-assisted magnetic recording head according to claim 8, wherein the gap layer consists essentially of one or more materials selected from $SiO_2$, $Al_2O_3$, MgO, ZnO, TaSiO, $MgF_2$, SiON, AlON, and ITO.

13. A head gimbal assembly, comprising:
    a magnetic head slider having a side surface, the side surface including the thermally-assisted magnetic recording head according to claim 1; and
    a suspension having an end, the end being attached with the magnetic head slider.

14. A head arm assembly, comprising:
    a magnetic head slider having a side surface, the side surface including the thermally-assisted magnetic recording head according to claim 1;

a suspension having a first end and a second end, the first end being attached with the magnetic head slider; and an arm supporting the suspension at the second end thereof.

15. A magnetic disk unit provided with a magnetic recording medium and a head arm assembly, the head arm assembly comprising:

a magnetic head slider having a side surface, the side surface including the thermally-assisted magnetic recording head according to claim 1;

a suspension having a first end and a second end, the first end being attached with the magnetic head slider; and an arm supporting the suspension at the second end thereof.

16. A thermally-assisted magnetic recording head, comprising:

a magnetic pole having an end exposed on an air-bearing surface;

a waveguide;

a plasmon generator formed essentially of a first metallic material, and having a first region and a second region, the first region extending backward from the air-bearing surface to a first position, and the second region being coupled with the first region at the first position and extending backward from the first position;

a metallic layer filling a part in the second region, and formed essentially of a second metallic material that has a higher melting temperature than a melting temperature of the first metallic material;

a cladding layer; and a gap layer provided between the magnetic pole and the first region and extending backward from the air-bearing surface to a second position that is located backward of the first position, and being made of a dielectric material, wherein the first region is circumferentially surrounded by the cladding layer, the plasmon generator is provided between the magnetic pole and the waveguide, and the metallic layer extends backward from a third position that is located between the first position and the second position.

* * * * *